United States Patent [19]

Yamamoto et al.

[11] Patent Number: 4,807,571
[45] Date of Patent: Feb. 28, 1989

[54] EXHAUST TIMING CONTROL APPARATUS
[75] Inventors: Hitoshi Yamamoto, Shiki; Takumi Tottori, Saitama; Tsugio Ikeda, Saitama; Kouji Okazaki, Saitama, all of Japan
[73] Assignee: Honda Giken Kogyo Kabushiki Kaisha, Tokyo, Japan
[21] Appl. No.: 85,673
[22] Filed: Aug. 13, 1987

Related U.S. Application Data

[63] Continuation-in-part of Ser. No. 888,823, Jul. 22, 1986, abandoned.

[30] Foreign Application Priority Data

Jul. 22, 1985 [JP] Japan .................................. 60-112169
Feb. 25, 1986 [JP] Japan .................................. 61-39890

[51] Int. Cl.⁴ .............................................. F02B 75/02
[52] U.S. Cl. .................................. 123/65 PE; 123/323
[58] Field of Search .............. 123/65 PE, 65 V, 65 P, 123/323, 73 SP

[56] References Cited

U.S. PATENT DOCUMENTS

| 4,121,552 | 10/1978 | Mithuo | 123/65 PE |
|---|---|---|---|
| 4,202,297 | 5/1980 | Oku | 123/65 PE |
| 4,333,431 | 6/1982 | Iio | 123/323 |
| 4,341,188 | 7/1982 | Nerstrom | 123/324 |
| 4,364,346 | 12/1982 | Shiohara | 123/323 |
| 4,388,894 | 6/1983 | Tanaka | 123/65 PE |
| 4,391,234 | 7/1983 | Holzleitner | 123/65 V |
| 4,399,788 | 8/1983 | Bostelmann | 123/323 |
| 4,516,540 | 5/1985 | Nerstrom | 123/65 PE |
| 4,541,371 | 9/1985 | Kageyama | 123/65 PE |
| 4,621,596 | 11/1986 | Uchinishi | 123/65 PE |
| 4,622,928 | 11/1986 | Uchinishi | 123/65 PE |
| 4,672,925 | 6/1987 | Miyata et al. | 123/65 |

FOREIGN PATENT DOCUMENTS

| 0210829A1 | 4/1987 | European Pat. Off. . |
|---|---|---|
| 0212857A1 | 4/1987 | European Pat. Off. . |
| 3232786A1 | 4/1984 | Fed. Rep. of Germany . |
| 47-36047 | 9/1972 | Japan . |
| 51-147813 | 11/1976 | Japan . |
| 51-21038 | 2/1976 | Japan . |
| 51-39112 | 3/1976 | Japan . |
| 51-42497 | 4/1976 | Japan . |
| 51-74623 | 6/1976 | Japan . |
| 51-147813 | 11/1976 | Japan . |
| 52-18333 | 4/1977 | Japan . |
| 52-132916 | 10/1977 | Japan . |
| 54-158514 | 12/1979 | Japan . |
| 55-160107 | 12/1980 | Japan . |
| 56-27014 | 3/1981 | Japan . |
| 56-47609 | 4/1981 | Japan . |
| 0068508 | 4/1982 | Japan | 123/65 PE |
| 57-62917 | 4/1982 | Japan . |
| 57-105511 | 7/1982 | Japan . |
| 58-7059 | 2/1983 | Japan . |
| 58-7060 | 2/1983 | Japan . |
| 58-36818 | 8/1983 | Japan . |
| 59-7008 | 2/1984 | Japan . |
| 0101534 | 6/1984 | Japan | 123/65 PE |
| 59-105928 | 6/1984 | Japan . |
| 62-6430 | 1/1987 | Japan . |
| 60-97274 | 1/1987 | Japan . |
| 60-161477 | 1/1987 | Japan . |
| 60-112169 | 1/1987 | Japan . |
| 62-28035 | 2/1987 | Japan . |
| 60-121026 | 2/1987 | Japan . |
| 62-29435 | 2/1987 | Japan . |
| 60-200779 | 3/1987 | Japan . |
| 62-70619 | 4/1987 | Japan . |
| 61-18381 | 7/1987 | Japan . |

Primary Examiner—Charles J. Myhre
Assistant Examiner—David A. Okonsky
Attorney, Agent, or Firm—Lyon & Lyon

[57] ABSTRACT

An exhaust timing control apparatus for two-cycle engines of the type having one or more exhaust ports extending outwardly from the cylinder. A valve body is pivotally mounted within the exhaust passage in a recess specifically provided therefore. The valve has a control surface approaching the cylinder to define an apparent upper timing edge of the exhaust port. Holes are provided through the valve body for flow to operate to inhibit the build up of carbon deposits which often inhibit the operation of the valve. An inclined surface may be formed on the surface of the valve body to facilitate the removal of carbon. Edges may also be provided on the valve body which cooperate with the walls of the recess in the exhaust passage to knock off carbon build up such that it might be conveyed through the exhaust pipe and from the system.

26 Claims, 16 Drawing Sheets

EXHAUST TIMING CONTROL APPARATUS

CROSS-REFERENCE TO RELATED APPLICATION

This application is a continuation-in-part of applicants' co-pending application Ser. No. 888,823, filed July 22, 1986, now abandoned.

BACKGROUND OF THE INVENTION

The field of the present invention is timing mechanisms for the exhaust ports of two cycle engines.

Two-cycle engines typically employ the upper edge of a piston as the means for timing the opening and closing of exhaust ports. In such engines, the exhaust passage may be tuned such that a reflected wave of pressure initiated by the opening of the exhaust ports can force unburned air fuel mixture, trailing the exhaust gases through the exhaust passage, back into the cylinder just prior to closure of the exhaust porting This tuning is specifically effective at a limited range of engine speeds. Often power can drop off remarkably when the engine speed does not fall within the tuned range.

To broaden the effective power range for two-cycle engines, exhaust timing control devices have been employed which provide an apparent upper timing edge to the exhaust porting that may be moved upwardly or downwardly depending on engine speed. In this way, power can be realized across a broader range of engine speeds. As the timing for both the opening and closing of the exhaust porting is changed through movement of a valve mechanism, the timing can better employ the pressure wave in the exhaust passage.

A difficulty which has been encountered with such timing mechanisms located within the exhaust passages of a two-cycle engine is that carbon can build up and prevent the proper actuation of the timing device. This can eventually result in a totally inoperative condition.

SUMMARY OF THE INVENTION

The present invention is directed to an exhaust timing control apparatus designed to define an apparent upper timing edge of the exhaust port which varies with engine speed. In the present apparatus, means are provided for reducing carbon build up which might otherwise interfere with or disable the actuation of the timing mechanism.

In accordance with the foregoing, a valve body may be provided in the upper portion of the exhaust passage of a two-cycle engine which extends to a control surface at the cylinder. Holes extend through the body of the valve such that flow in the exhaust passage can move about the valve and advantageously therethrough to rid the valve of carbon which might otherwise accumulate and interfere with valve operation. A variety of holes are proposed in several embodiments including holes directly through the main portion of the body of the valve which holes may be tapered through a portion of their length. Holes may also be employed through an upstanding ridge adjacent the control surface so as to provide flow into the area above the valve body. In a further aspect of the invention, strategically placed ridges may be employed which act to dislodge carbon from locations of possible interference.

Accordingly, it is an object of the present invention to provide an improved exhaust timing control apparatus for two-cycle engines. Other and further objects and advantages will appear hereinafter.

DETAILED DESCRIPTION OF THE PREFERRED EMBODIMENT

Figure 1:
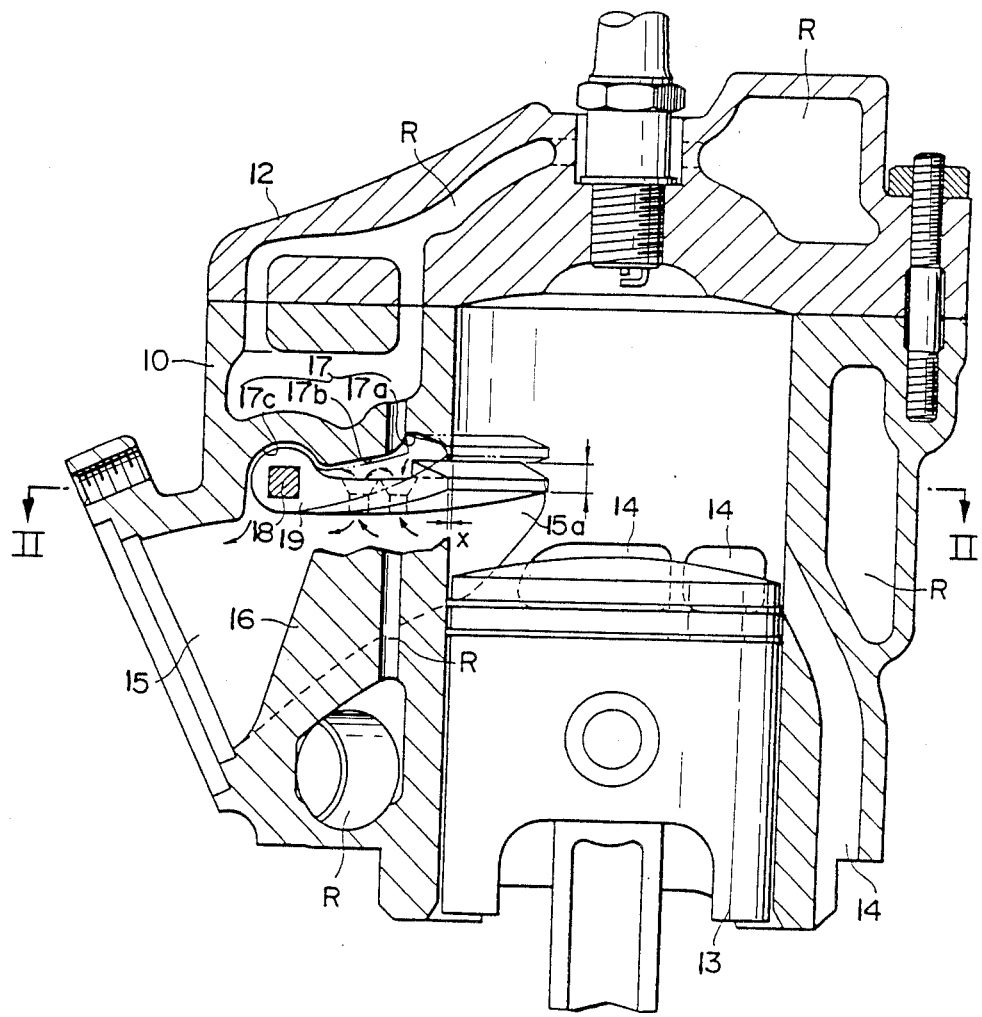
FIG. 1 is a cross-sectional elevation of a two-cycle engine employing an exhaust timing control apparatus of the present invention.
Figure 2:
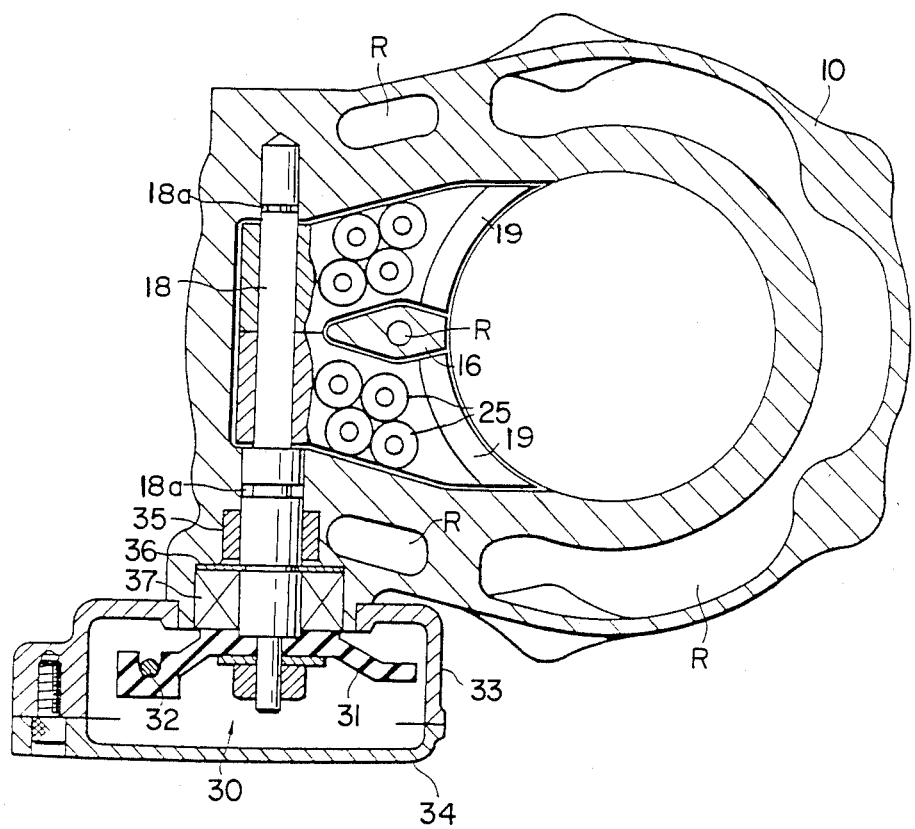
FIG. 2 is a cross-sectional plan view taken along lines II—II of FIG. 1.
Figure 3:
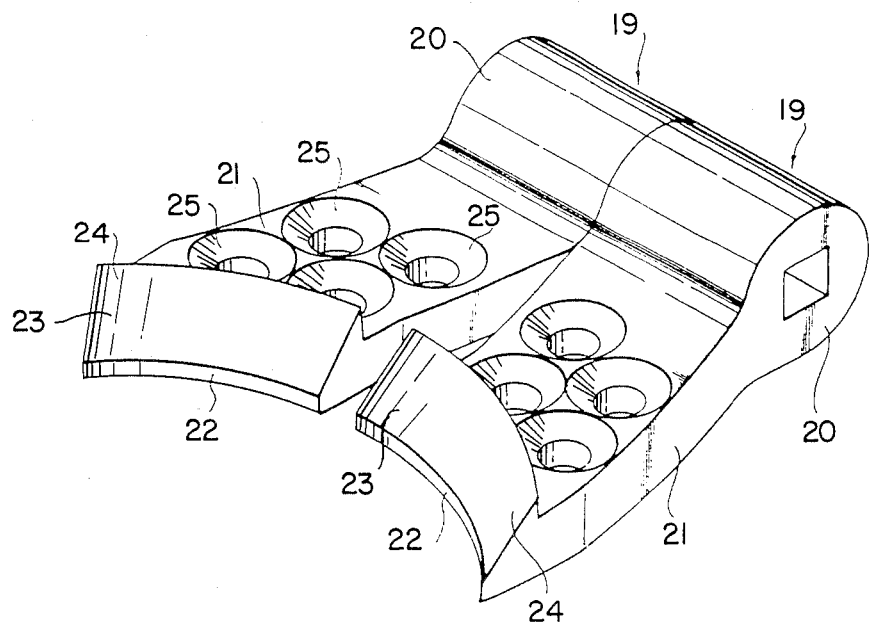
FIG. 3 is an oblique view of a valve of the embodiment in FIGS. 1 and 2.

FIGS. 1, 2, and 3 illustrate a first embodiment of the present invention. The two-cycle engine illustrated includes a cylinder block 10 having a cylinder head 12 and a piston 13 slidably operating within the cylinder. Scavenging passage 14 and exhaust passages 15 extend from the cylinder. A reinforcing rib 16 extends parallel to the axis of the cylinder and is disposed in the vicinity of the exhaust port 15a of the exhaust passages 15 to divide it into two openings. The rib 16 has the function of preventing a piston ring from spreading out in the radial direction so as to interfere with the upper or lower edge of the exhaust port 15a. Further, the rib 16 has the function of reinforcing the portion of the cylinder block 10 in the vicinity of the openings of the exhaust passage 15.

A recessed portion 17 is provided in the upper portion of the exhaust passages 15 for accommodating the exhaust timing control apparatus. In the recessed portion 17, a shaft 18 is rotatably provided which lies in the plane extending perpendicularly to the center line of the cylinder. The center portion of the shaft 18 is shaped in a square cross-section to avoid relative rotation with the valve bodies carried thereon. Two elements of a valve body 9 for controlling the exhaust timing are mounted on the shaft 18 and disposed on opposite sides of the rib 16. Ring grooves 18a are formed to either side of the valve bodies 19 on the shaft 18 in the support portion thereof.

Elements of the valve body 19 are symmetrical with each other. Each element has a shaft bearing portion 20 through which the shaft 18 is inserted. A plate-like portion 21 extends from the bearing portion 20. A control surface 22 is provided at the opposite end of the valve body 19 from the bearing portion 20. The control surface 22 has a curvature which is nearly equal to that of the inner surface of the cylinder such that it approximates a segment of the cylinder when in position. An upwardly extending ridge 24 is provided on the upper portion of the control surface 22. The ridge 24 is connected to the upper edge of the control surface 22 and has an incline surface 23, inclined upwardly and rearwardly from the control surface 22. The plate-like portion 21 of the valve body 19 is provided with a plurality of holes 25. The holes 25 extend through the body of the valve from adjacent the recessed portion 17 of the passage 15 to communicate with the main portion of the exhaust passage. The upper portion of each of the holes 25 is chamfered to about twice the diameter of the main cylindrical portion of each hole 25. Thus, an incline surface is formed. The arrangement of the valve body 19 in the cylinder block 10 is such that a small clearance x is provided between the control surface 22 and a projection of the wall of the cylinder.

The surface of the recessed portion 17 has a shape which generally corresponds to the upper surfaces of the respective valve bodies 19. A first recess 17a, triangular in cross-section, is arranged to accommodate the upwardly extending ridges 24. A flat portion 17b accommodates the plate-like portion 21. A curve portion 17c receives the bearing portion 20.

The valve bodies 19 are arranged to be operated by a drive mechanism 30 through the shaft 18 in accordance with the rotational speed of the engine. A valve body 19, the shaft 18 and a drive mechanism 30 make up an exhaust timing control apparatus for opening and closing the upper portions of the respective exhaust passages 15. The drive mechanism 30, as shown in FIG. 2, includes a wire guide 31 coupled with one end of the shaft 18 and extending out of the cylinder block 10. A motor (not shown) may be connected to the wire guide 31 through a wire 32. A controller for reversibly rotating the motor in accordance with the rotational speed of the engine would be employed in such an instance.

The portion of the shaft 18 extending out of the cylinder block 10 and the wire guide 31 are covered by a case 33 mounted on the cylinder block 10. A case cover 34 is screwed onto the wire case 33. A bushing 35, a positioning retainer 36 and a sealing member 37 are disposed on one end of the shaft 18. Passages R represent cooling water flow passages for cooling the engine.

In operation, when the engine is operated at low speeds, the shaft 18 is rotated to swing the valve body 19 such that it projects into the exhaust passage 15. By the movement of the valve body 19, the control surface 22 is positioned in the middle of the upper portion of the port 15a to lower the effective upper timing edge of the exhaust port by an apparent distance L. Accordingly, as the control surface 22 is lowered by the distance L, the exhaust port 15a is opened later and closed earlier by the working piston. This adjustment aids in timing the closing of the exhaust valve to the return of the exhaust pressure wave reflected within the exhaust passage. Thus, engine efficiency can be improved at low speeds.

With the engine running at high speeds, the valve body 19 is moved upwardly from the main path of the exhaust passage. Thus, the exhaust port 15a is opened earlier and closed later by the working piston. This allows a reflected wave to again improve efficiency at a high speed. A variety of controls including a two position control or a continuous control might be employed with the foregoing arrangement.

Since the holes 25 are provided through the valve body 19, exhaust gases can pass through the holes 25 as shown by the arrows in FIG. 1. This provides flow through the area between the upper surfaces of the valve body 19 and the surfaces of the accommodating recessed portion 17.

Figure 6:
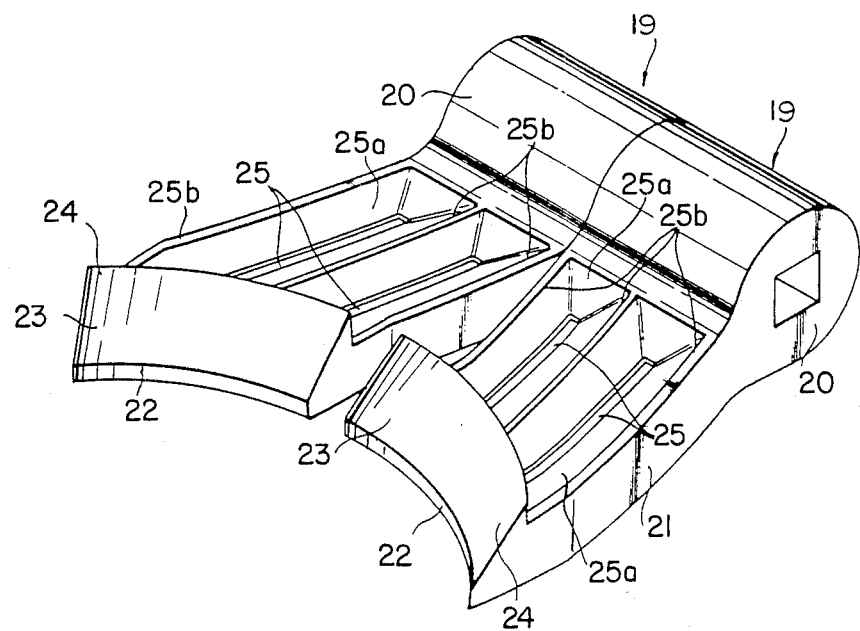
FIG. 6 is an oblique view of valves of the present invention illustrating yet another hole pattern.

If carbon does proceed to develop, the small surface areas around the through holes 25 such as ridges 25b as seen in FIG. 6 can impact on the deposits and prevent further accumulation of carbon. Again, the flow through the holes 25 can then draw off the carbon from these problem areas.

It has been found that the holes 25 do not appear to interfere with the operation and effectiveness of the valves 19. At the same time, the build up of carbon is reduced.

Figure 4:
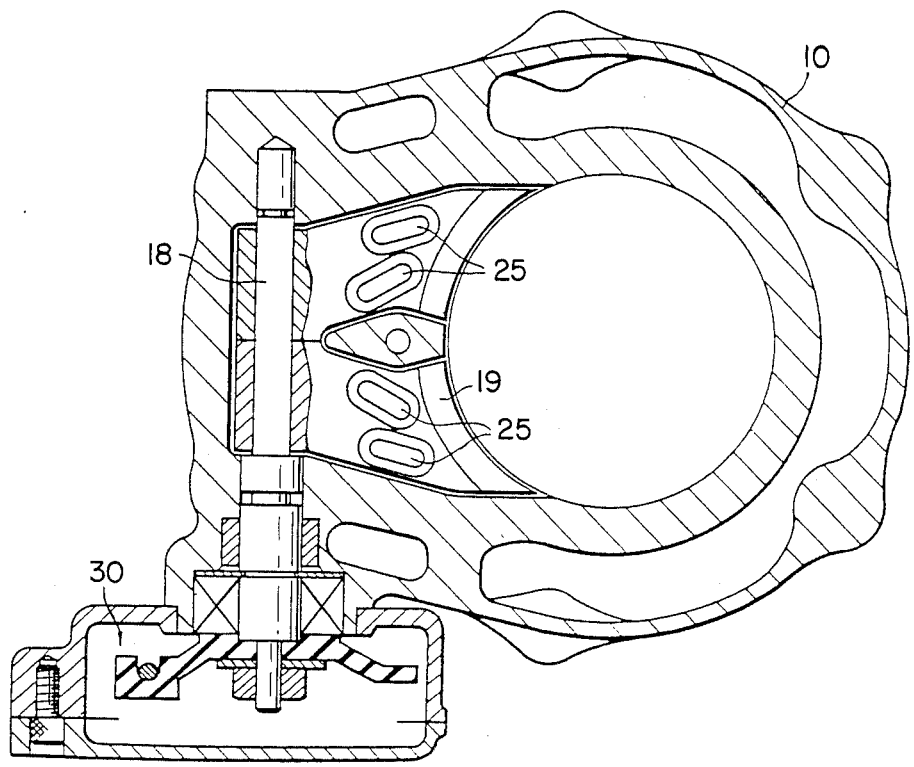
FIG. 4 is a plan view similar to the view of FIG. 2 illustrating an alternate hole pattern in the valves thereof.
Figure 5:
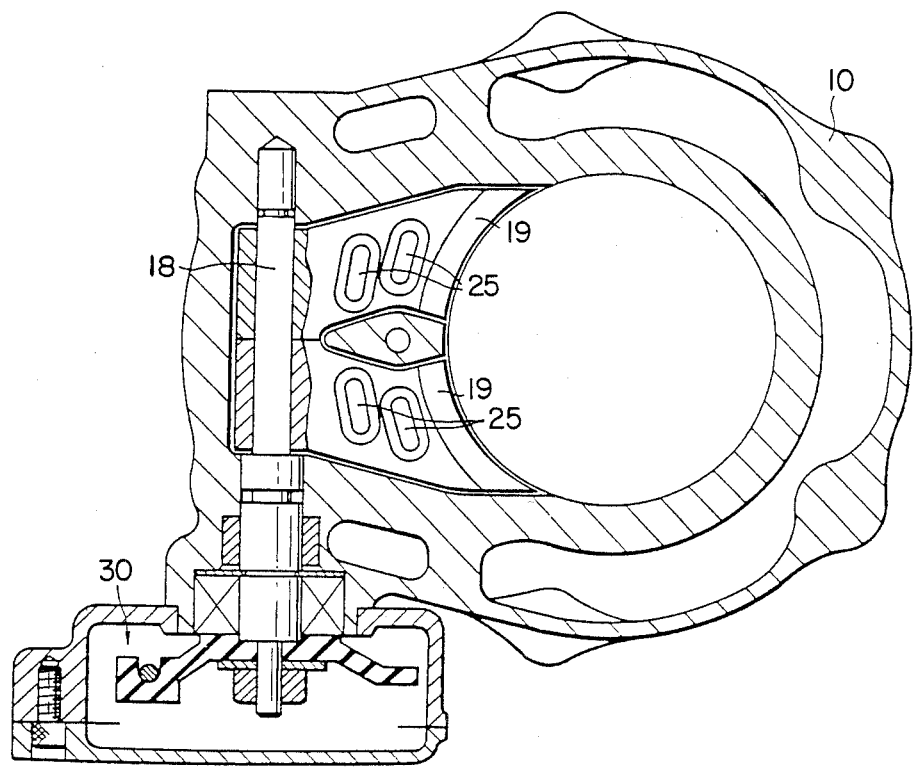
FIG. 5 is a cross-sectional plan view as in FIG. 4 illustrating yet another hole pattern.

As can be seen from the embodiments, several hole shapes may be provided without impacting on the operability thereof. Elongated holes in plan with major axes in a variety of orientations, such as seen in FIGS. 4 and 5, may be employed. Further, as any hole is helpful, a single hole may b employed.

FIG. 6 illustrates yet another embodiment with rectangular holes 25 having the major axes extending along the lengthwise direction of the valve bodies. With the inclined surfaces illustrated therein, the whole upper surface of the valve bodies 19 is covered with the incline surface 25a with the exception of the ridges 25b.

Figure 7:
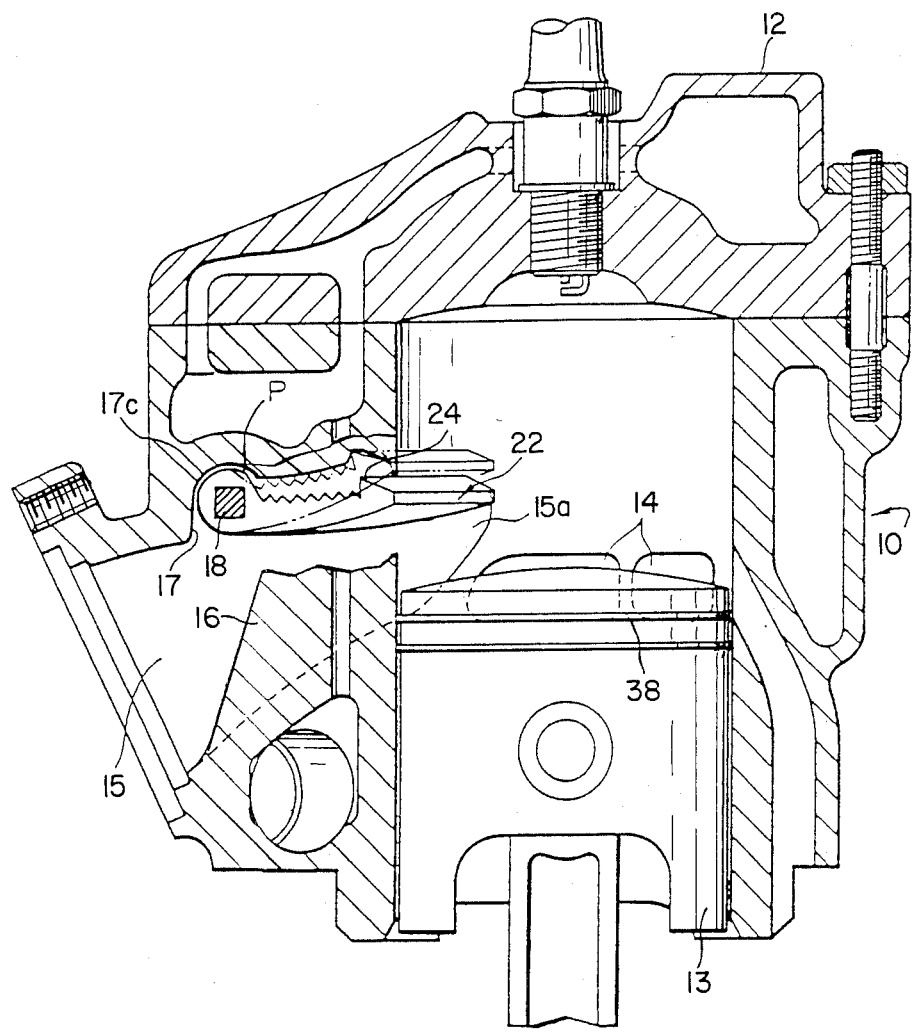
FIG. 7 is a cross-sectional elevation of a two-cycle engine illustrating another embodiment of the present invention.
Figure 8:
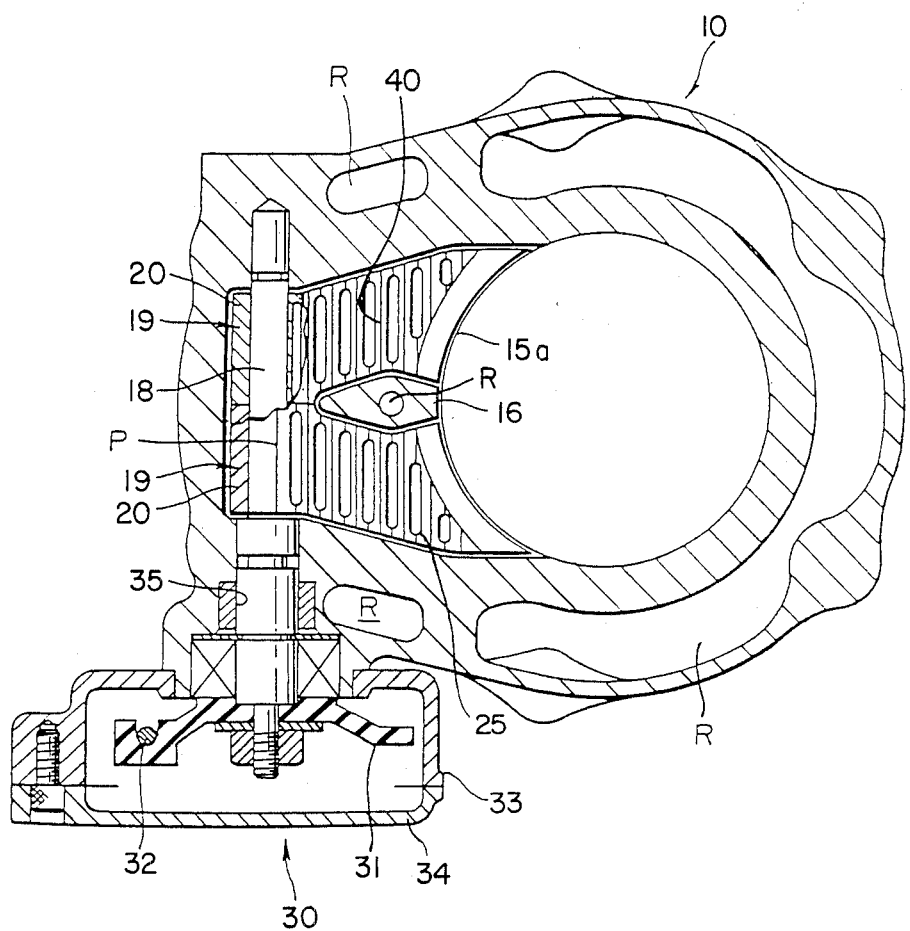
FIG. 8 is a plan view in cross-section of the device of FIG. 7.
Figure 9:
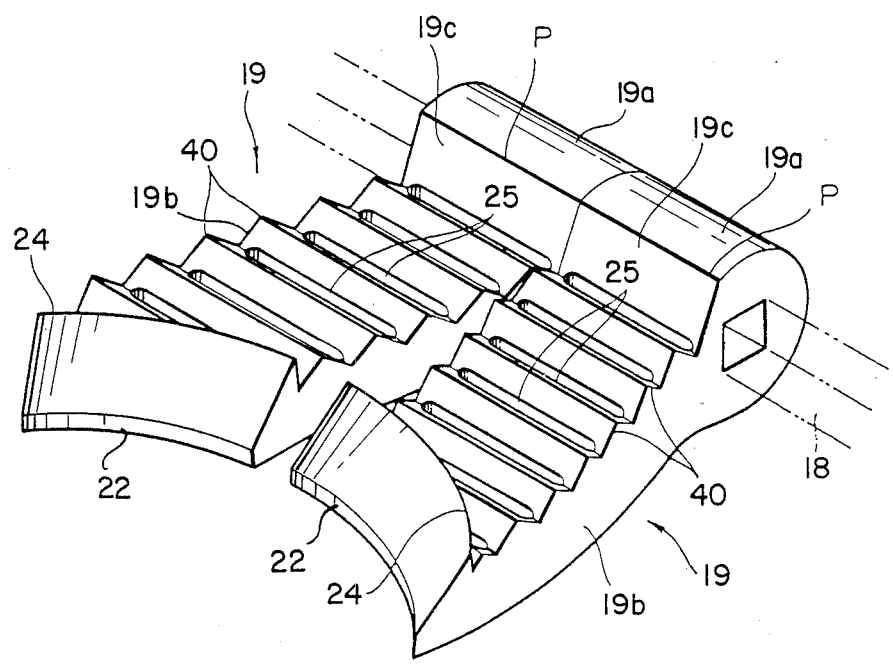
FIG. 9 is an oblique view of the valves of the device of FIGS. 7 and 8.

Looking next to the embodiment of FIGS. 7, 8 and 9, the same reference numbers are applied to each embodiment where identical or equivalent components are illustrated. Repetitive description of such components will be minimized in the description herein. Directing attention to the shaft bearing portion 19a, an end surface 19c is formed on the upper surface of the shaft bearing portion 19a and extends to the main body portion 19b. The end surface 19c rises steeply in a substantially perpendicular manner to the valve portion 19b. Thereby, an edge P is formed between the end surfaces 19c and the upper portion of the shaft bearing portion 19a. The edge P functions to work on carbon deposited on the upper surface 17c of the recessed portion 17 whenever the valve body 19 is actuated The valve portion 19b is provided with a upwardly extending ridge 24. The end surface of the ridge 24 is formed to have a curvature nearly equal to that of the inner surface of the cylinder for the purpose of matching with that inner surface. A plurality of ridges 40 are formed on the upper surface of the valve portion 19b which are parallel to the shaft bearing portion 19a. Holes 25 extend through the valve portion 19b and are arranged between adjacent ridges 40.

The operation of the holes 25 and of the components of the valve surfaces in cooperation with the contoured recess area operate in a manner similar to that of the prior embodiments in removing carbon from the valve apparatus. Furthermore, the valve apparatus also works as described with regard to the prior embodiment.

Figure 10:
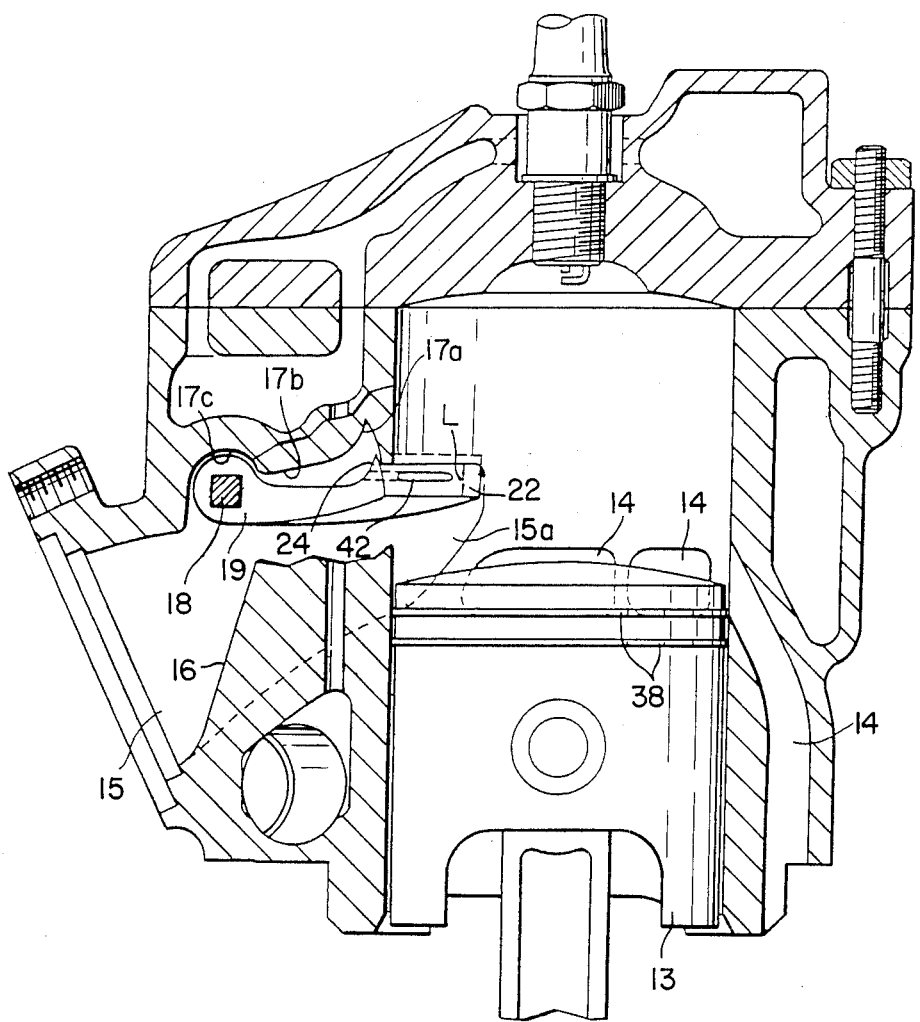
FIG. 10 is a cross-sectional elevation of a two-cycle engine illustrating another embodiment of the present invention.
Figure 11:
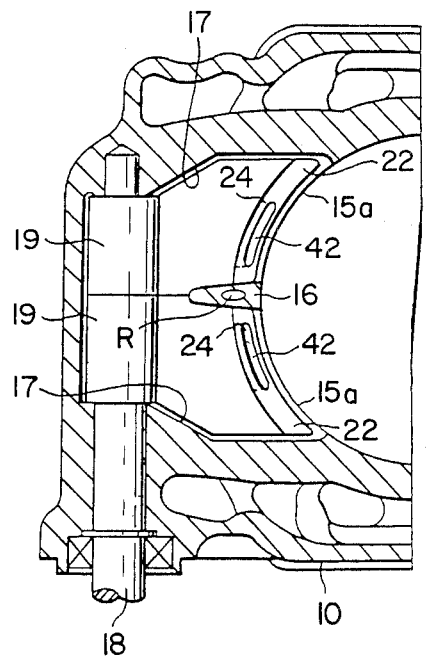
FIG. 11 is a cross-sectional plan view illustrating the embodiment in FIG. 10.

Turning next to the embodiment of FIGS. 10 and 11, a similar engine is illustrated which, in general, need not be described further. Again, corresponding numbers have been employed in this embodiment as well. Holes 42 extend through the upwardly extending ridge from the area adjacent the control surface 22 to above the main body of the valves 19. The relative size of these holes 42 is dependent on the effect at low engine speeds. The effect of the holes 42 on reducing carbon build up is achieved by the flow of gas associated with the exhaust passage. In this way, carbon may be ejected into the exhaust passage through gaps about the valve body 19 with the pressure created through the holes 42. Naturally, holes such as employed in the first embodiment herein may also be incorporated in this embodiment.

Figure 12:
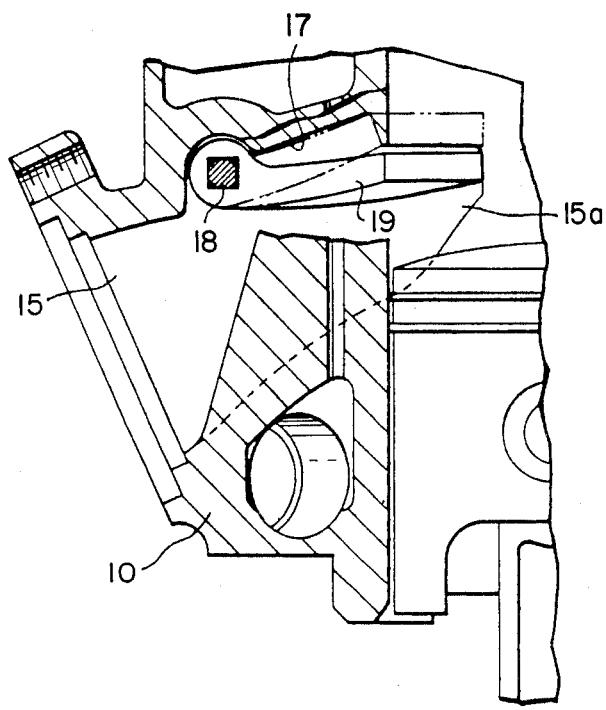
FIG. 12 is a cross-sectional elevation illustrating another embodiment of the present invention.
Figure 13:
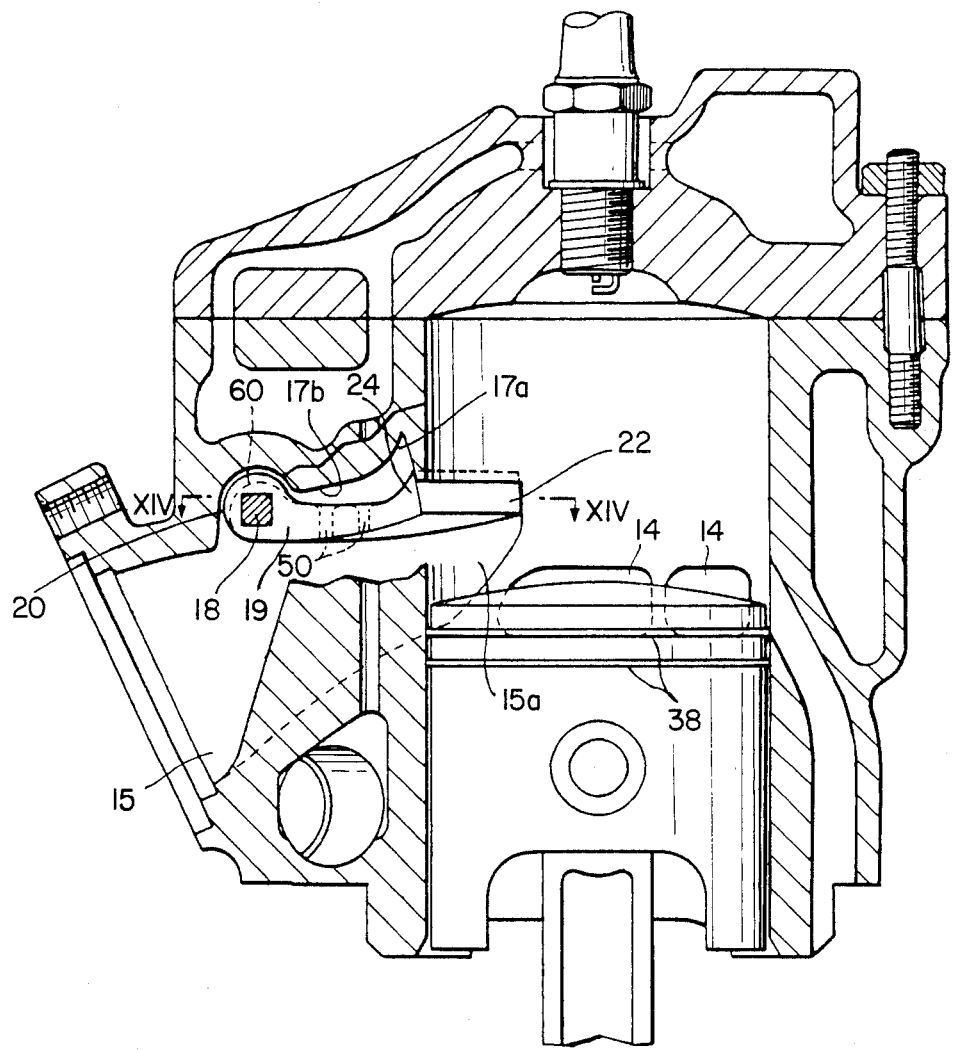
FIG. 13 is a cross-sectional elevation of a two-cycle engine employing another embodiment of the present invention.
Figure 14:
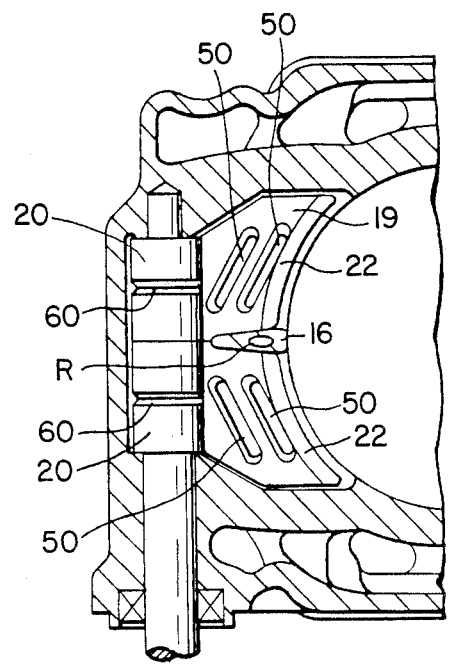
FIG. 14 is a cross-sectional plan view taken along lines XIV—XIV of FIG. 13.

Turning now to the embodiment at FIGS. 12, 13, and 14, a similar engine is again illustrated which, in general, need not be described further. Once again, corresponding numbers have been employed in the figures depicting this embodiment. Elongated holes 50 extend through the plate-like portion of the valve body 19 in such a manner that the major axes of the elongated holes 50 lie within the plane of the plate-like portion of the valve body 19. Connecting grooves 60 are formed in the bearing portion 20 of the valve body 19 in such a manner that the connecting grooves 60 form impressions in the bearing portion 20 from the top of the plate-like portion of the valve body 19 continuing around the bearing portion 20 to the bottom of the valve body 19, as shown in FIG. 13. Thus, gases that have penetrated into the recessed portion 17 flow through the connecting grooves 60 out into the exhaust passage 15. Furthermore, because the elongated holes 50 pass through the plate-like portion of the valve body 19, combustion gas and mixture may flow through the elongated holes 50 as well as around the edges of the valve body 19 to wash the internal surface of the recessed portion 17 and the top surface of the valve body 19, so that carbon contained in the combustion gas is prevented from depositing onto the surface of the recessed portion 17 or the top of the valve body 19.

Figure 15:
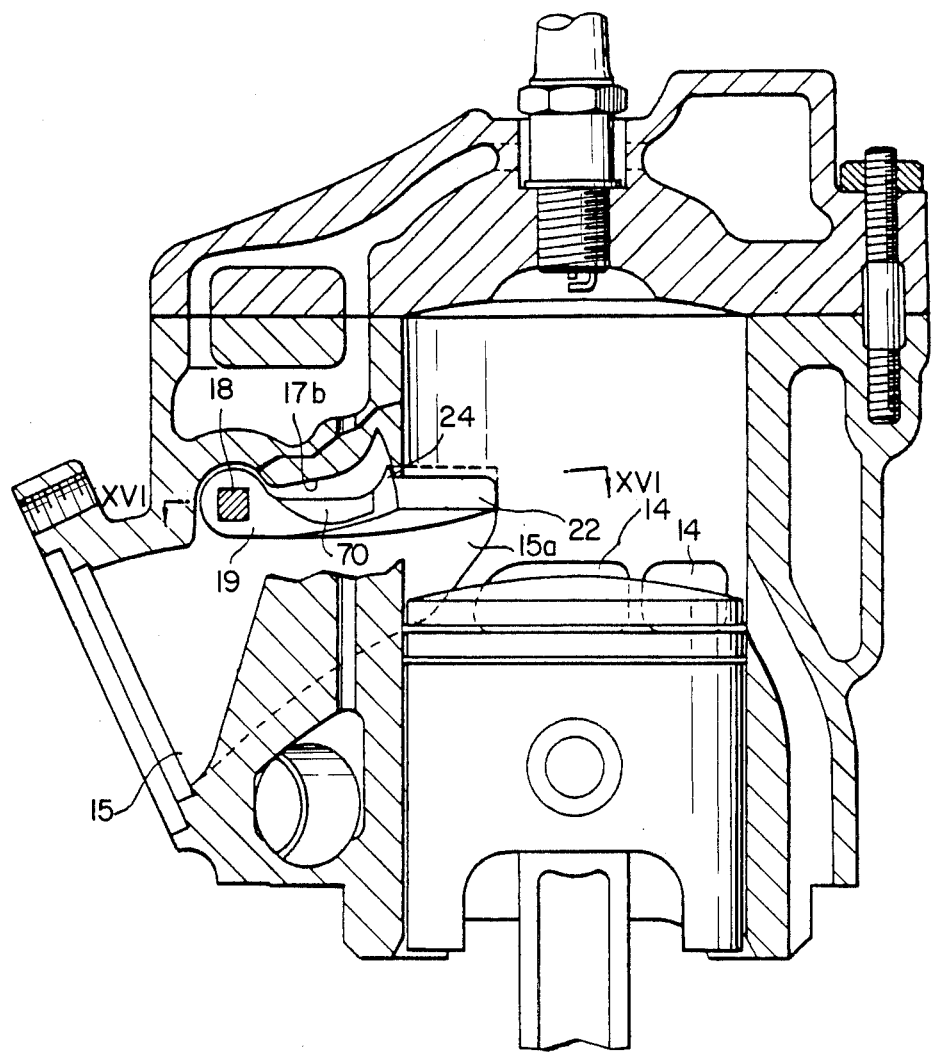
FIG. 15 is a cross-sectional elevation of a two-cycle engine employing a further embodiment of the present invention.
Figure 16:
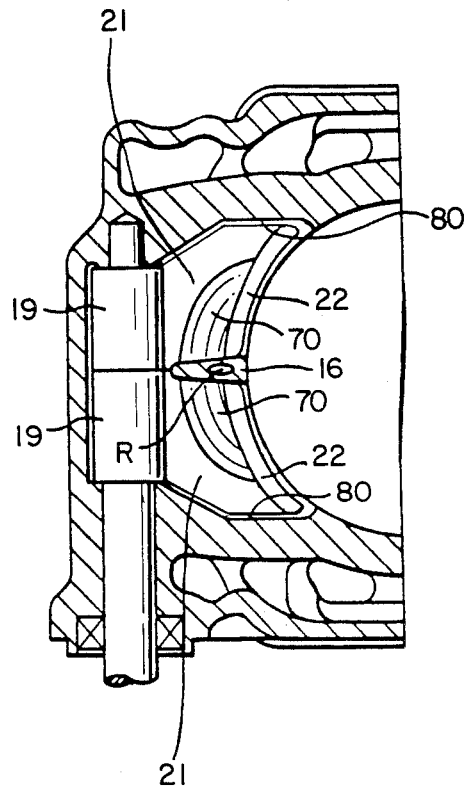
FIG. 16 is a cross-sectional plan view taken along lines XVI—XVI of FIG. 15.

Turning to FIGS. 15 and 16, a further embodiment of the present invention is shown. Once again, corresponding numbers have been used in FIGS. 15 and 16. An inclined face 70 is formed on the plate-like portion 21 of valve body 19 in such a manner as to slope upwardly away from the upwardly extending ridge 24. The inclined face 70 is formed into a cavity shape in such a manner that carbon that falls on to the surface of the inclined face 70 will fall towards the rib 16 which runs between the two halves of the valve body 19. In this manner, carbon deposits that fall on to the inclined surface 70 will fall through the clearance between the valve body 19 and the rib 16 In operation, part of the combustion gas that is exhausted to the exhaust passage 15 enters between the internal surface of the recessed portion 17 and the top surface of the valve body 19, whereby carbon deposits onto the top surface of the valve body 19. However, this carbon moves down the inclined face 70 to drop between the valve body 19 and the rib 16 into the exhaust passage 15. This movement of carbon into the exhaust passage 15 is facilitated by both the relative movement of the valve body 19 with respect to the rib 16, and also by being sucked out from the recessed portion 17 by negative pressure that forms in the vicinity of the exhaust port 15a when the cylinder is exhausting.

In this manner, deposition of carbon onto the valve body 19 is controlled and an increase in the inertial mass of the valve body 19 is prevented. It will be apparent to one skilled in the art that the shapes and dimensions shown in the figures demonstrating this embodiment of the present invention are by way of example, and may be changed. Thus, the inclined face 70 may be formed in such a manner as to incline outwardly towards the sides of the valve body 19 rather than the center of the valve body 19 at the rib 16.

Thus, a plurality of exhaust timing control devices are disclosed which operate to inhibit carbon build up. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An exhaust timing control apparatus for a two-cycle engine cylinder having an exhaust port and passage extending from a sidewall of the cylinder comprising:
   a valve body pivotable about a pivot axis in the exhaust passage toward and away from a surface of the exhaust passage, the value body extending to a control surface at the exhaust port to define an apparent upper timing edge of the exhaust port, said valve body having at least one hole extending through said body at a location on said body between said pivot axis and said control surface.

2. The exhaust timing control apparatus of claim 1 wherein said hole extends through said body in a direction generally parallel to the axis of the cylinder.

3. The exhaust timing control apparatus of claim 2 wherein there are multiple said holes.

4. The exhaust timing control apparatus of claim 2 wherein said hole includes a first portion toward the upper wall of the exhaust passage having a tapered cross-section tapering outwardly toward the upper wall of the exhaust passage and a second portion of cylindrical cross-section extending from said tapered portion through the remainder of said body.

5. The exhaust timing control apparatus of claim 4 wherein said hole is elongated in cross-section.

6. The exhaust timing control apparatus of claim 1 wherein the upper surface of the valve body adjacent the pivot axis includes an edge portion extending parallel to the pivot axis and extending to adjacent the upper surface of the exhaust passage.

7. The exhaust timing control apparatus of claim 1 wherein said valve body includes an upwardly extending ridge adjacent said control surface and an upper surface adjacent said upwardly extending ridge recessed below said ridge, said hole extending through said upwardly extending ridge from adjacent said control surface to above said upper surface.

8. The exhaust timing control apparatus of claim 2 wherein said hole is elongated in cross-section.

9. The exhaust timing control apparatus of claim 8 wherein there are multiple of said holes.

10. An exhaust timing control apparatus for a two-cycle engine having a cylinder with an exhaust port and passage extending from a sidewall of the cylinder, comprising:
    a valve body pivotable about a pivot axis in the exhaust passage toward and away form a surface of the exhaust passage, the valve body extending to a control surface at the exhaust port to define an apparent upper-timing edge of the exhaust port, said valve body having an inclined surface on the upper portion of the valve body at a location between said pivot axis and said control surface.

11. The exhaust timing control apparatus of claim 10 wherein said inclined surface inclines downward toward said control surface of said valve body.

12. The exhaust timing control apparatus of claim 11 wherein said inclined surface further inclines toward a line perpendicular to said pivot axis, said line dividing said valve body into two parts.

13. The exhaust timing control apparatus of claim 11 wherein said inclined surface is further inclined toward the sides of said valve body, which sides of said valve body face the sides of said exhaust passage.

14. An exhaust timing control apparatus for a two-cycle engine, having a cylinder with an exhaust port and a passage extending from a sidewall of the cylinder, comprising:
a valve body pivotally mounted by a bearing portion about a pivot axis in the exhaust passage, the valve body pivotable towards and away from a surface of the exhaust passage, with the valve body extending to a control surface at the exhaust port to define an apparent upper timing edge of the exhaust port, said bearing portion having a groove extending partially about its circumference in a plane perpendicular to said pivot axis.

15. The exhaust timing control apparatus of claim 14 wherein said groove extends from the top of a plate-like portion of said valve body to a point below the pivot axis of said valve body.

16. The exhaust timing control apparatus of claim 14 wherein said valve body has at least one hole extending through said valve body at a location on said valve body between said pivot axis and said control surface.

17. The exhaust timing control apparatus of claim 16 wherein said hole extends through said valve body in a direction generally parallel to the axis of the cylinder.

18. The exhaust timing control apparatus of claim 17 wherein said hole is elongated in cross-section.

19. The exhaust timing control apparatus of claim 18 wherein there are multiple of said holes.

20. An exhaust timing control apparatus for a two-cycle engine, having a cylinder with an exhaust port and a passage extending from a sidewall of the cylinder, comprising:
a valve body pivotally mounted by a bearing portion about a pivot axis in the exhaust passage, the valve body pivotable towards an away from a surface of the exhaust passage, the valve body extending to a control surface at the exhaust port to define an apparent upper timing edge of the exhaust port, said bearing portion having a groove extending partially about its circumference in a plane perpendicular to said pivot axis from the top of a plate-like portion of said valve body to a point below the pivot axis of said valve body; and at least one hole extending through said valve body at a location on said valve body.

21. The exhaust timing control apparatus of claim 20 wherein said hole extends through said valve body in a direction generally parallel to the axis of the cylinder.

22. The exhaust timing control apparatus of claim 21 wherein said hole is elongated in cross-section.

23. The exhaust timing control apparatus of claim 22 wherein there are multiple of said holes.

24. An exhaust timing control apparatus for a two-cycle engine cylinder having an exhaust port and exhaust passage extending from the sidewall of the cylinder, comprising:
a valve body pivotally mounted about a pivot axis in the exhaust passage and extending to a control surface at the exhaust port to define an apparent upper timing edge of the exhaust port, said exhaust passage having a cavity opposite said valve body defining a space which varies with pivotal movement of said valve body, said valve body having at lest one hole extending through said body at a location on said body between said pivot axis and said control surface.

25. An exhaust timing control apparatus for a two-cycle engine having a cylinder block including a cylinder, an exhaust port, and an exhaust passage extending from a sidewall of the cylinder, comprising:
a valve body pivotally mounted about a pivot axis in the exhaust passage and extending to a control surface at the exhaust port to define an apparent upper timing edge of the exhaust port, the valve body having at least one hole extending through the body at a location on the valve body between the pivot axis and the control surface;
a recess surface in the cylinder block disposed generally opposite to the valve body, with the recess surface and the valve body together defining an open space having a volume which is variable with the position of the valve body.

26. The apparatus of claim 25 wherein said valve body is at least partially substantially planer.

* * * * *

UNITED STATES PATENT AND TRADEMARK OFFICE
CERTIFICATE OF CORRECTION

PATENT NO. : 4,807,571

DATED : February 28, 1989

INVENTOR(S) : HITOSHI YAMAMOTO et al.

It is certified that error appears in the above-identified patent and that said Letters Patent is hereby corrected as shown below:

In claim 1 (column 6, line 25) delete "value" and insert therefor -- valve --.

In claim 20 (column 7, line 50) delete "an" and insert therefor -- and --.

Signed and Sealed this
Twenty-eighth Day of November 1989

*Attest:*

JEFFREY M. SAMUELS

*Attesting Officer*    *Acting Commissioner of Patents and Trademarks*